(12) United States Patent
Rekhi

(10) Patent No.: US 8,984,049 B1
(45) Date of Patent: Mar. 17, 2015

(54) ONLINE ADDRESS BOOK WITH MULTI-USE INPUT BAR AND PROFILE BOOKMARKING

(75) Inventor: Sachin Rekhi, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 89 days.

(21) Appl. No.: 13/363,739

(22) Filed: Feb. 1, 2012

(51) Int. Cl.
*G06F 15/16* (2006.01)
*G06Q 99/00* (2006.01)
*H04L 12/58* (2006.01)
*H04L 29/08* (2006.01)

(52) U.S. Cl.
CPC .............. *H04L 51/32* (2013.01); *H04L 67/306* (2013.01)
USPC ............................ 709/203; 709/204; 705/319

(58) Field of Classification Search
CPC ...... G06Q 10/10; G06Q 50/01; H04L 67/306; H04L 51/32
USPC ............................ 709/204, 206, 203; 715/319
See application file for complete search history.

(56) References Cited

U.S. PATENT DOCUMENTS

| | | | |
|---|---|---|---|
| 6,360,205 B1* | 3/2002 | Iyengar et al. | 705/5 |
| 2002/0049751 A1* | 4/2002 | Chen et al. | 707/3 |
| 2006/0042483 A1* | 3/2006 | Work et al. | 101/91 |
| 2006/0085517 A1* | 4/2006 | Kaurila | 709/217 |
| 2008/0019353 A1* | 1/2008 | Foote | 370/352 |
| 2009/0157732 A1* | 6/2009 | Hao et al. | 707/102 |
| 2009/0328142 A1* | 12/2009 | Wang et al. | 726/2 |
| 2010/0280904 A1* | 11/2010 | Ahuja | 705/14.58 |
| 2010/0306185 A1* | 12/2010 | Smith et al. | 707/709 |
| 2011/0072496 A1* | 3/2011 | Bertin et al. | 726/4 |
| 2011/0145270 A1* | 6/2011 | Christopher et al. | 707/769 |
| 2011/0153669 A1* | 6/2011 | Villa et al. | 707/784 |
| 2011/0167114 A1* | 7/2011 | Blanchard et al. | 709/204 |
| 2011/0264684 A1* | 10/2011 | Shafigi et al. | 707/769 |
| 2012/0158720 A1* | 6/2012 | Luan et al. | 707/732 |
| 2012/0158751 A1* | 6/2012 | Tseng | 707/751 |
| 2012/0203821 A1* | 8/2012 | Czajka | 709/203 |
| 2013/0125005 A1* | 5/2013 | French et al. | 715/738 |

* cited by examiner

*Primary Examiner* — Brian J Gillis
*Assistant Examiner* — Shean Tokuta
(74) *Attorney, Agent, or Firm* — Schwegman Lundberg & Woessner, P.A.

(57) ABSTRACT

An online address book is configured to include a multi-user input bar to receive search items intended to match contacts existing in a user's contact list. If a search term does not match any entry in the current contact list the search is extended by the multi-user input bar to include further candidate contacts. Candidate contacts are acquired through social profiles available from a set of networking sites linked-to over the Internet. A candidate contact that does match the search term is added to the contact list with a public profile whose contents are populated with contact data acquired from social profiles available through the networking sites. This practice of profile bookmarking may be applied iteratively across candidate contacts from various networking sites to build an extensive public profile.

17 Claims, 13 Drawing Sheets

FIG. 2

| Contacts | Companies | Daily | Search | | 200 | Name ▼ | James Branson | 🔍 |

Connected Search Results

*No results found.*

Social Network Search Results

Create a new contact pre-populated with data from the contact's relevant social profile.

| LinkedIn 305 | | Facebook 310 | | Twitter 315 | |
|---|---|---|---|---|---|
| Jamie Branson — Interactive Television & Internet/Mobile Broadcasting Specialist, London, United Kingdom | Create | James Branson | Create | Branson1982 — James Branson | Create |
| James Branson — Senior Consultant at Windstream.com, Little Rock, Arkansas Area | Create | James Branson — Embry-Riddle FL/AZ | Create | dbsings — James R Branson | Create 330 |
| Jim Branson — Agent at Farm Bureau Insurance, Greensboro/Winston-Salem, North Carolina Area | Create | James Branson — Dronfield Henry Fanshawe School | Create | jamesInSD — James Branson | Create |
| James Branson — Associate Director at Macquarie, Greater Philadelphia Area | Create | James Branson 320 | Create 325 | retrieverz — James Branson 98062 | Create |
| Jim Branson — Business Development Manager at Five-Star | Create | *more...* | | penn2la — james branson | Create |
| | | | | *more...* | |

ONLINE ADDRESS BOOK WITH MULTI-USE INPUT BAR AND PROFILE BOOKMARKING

TECHNICAL FIELD

This patent document pertains generally to data processing, and more particularly, but not by way of limitation, to an online address book with multi-use input bar and profile bookmarking.

BACKGROUND

The widespread connectivity provided by the Internet makes it the ideal source of connections for a user desiring to develop networking contacts. Networking is highly desirable by persons wanting to develop more extensive connections with contacts for career advancement, pursuit of job possibilities, and simply, to have persons to share common interests with. A user may take advantage of the broad spectrum of communication possibilities over the Internet to search for connections with networking sites hosting news, information, blogs, job possibilities and professional networking possibilities, to name just a few of the likely connections possible through the Internet.

In the course of pursuing these communication possibilities, the user may encounter a wide range and large number of contacts. Because of the wide variety of connections available on the Internet, the user may often find that a candidate contact encountered during pursuit of their communication connections is not a member of their network. Consequently, the user may not have immediate ways to connect with a prospective contact, let alone have enough background information on the candidate contact to determine whether they would make a good addition to their network. A contact may have posted an interesting blog comment at a professional networking site, and when encountered by the user, they may wonder if this person would make a good candidate contact for including him communications with other contacts in their personal network. Without further profile information being available for the contact the user may not be able to ascertain any corroborating interests or general information that would help in determining the user's interest in considering them a candidate contact and perhaps inviting the person to further communication within their network.

BRIEF DESCRIPTION OF DRAWINGS

Some embodiments are illustrated by way of example and not limitation in the figures of the accompanying drawings in which:

FIG. 2 is a diagrammatic representation of an online address book including a multi-use input bar, as may be used in an example embodiment;

FIG. 3 is a diagrammatic representation of a multi-use input bar search result, according to an example embodiment

FIG. 5 is a diagrammatic representation of a further profile bookmarking selection, according to an example embodiment

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Environment

Figure 1:
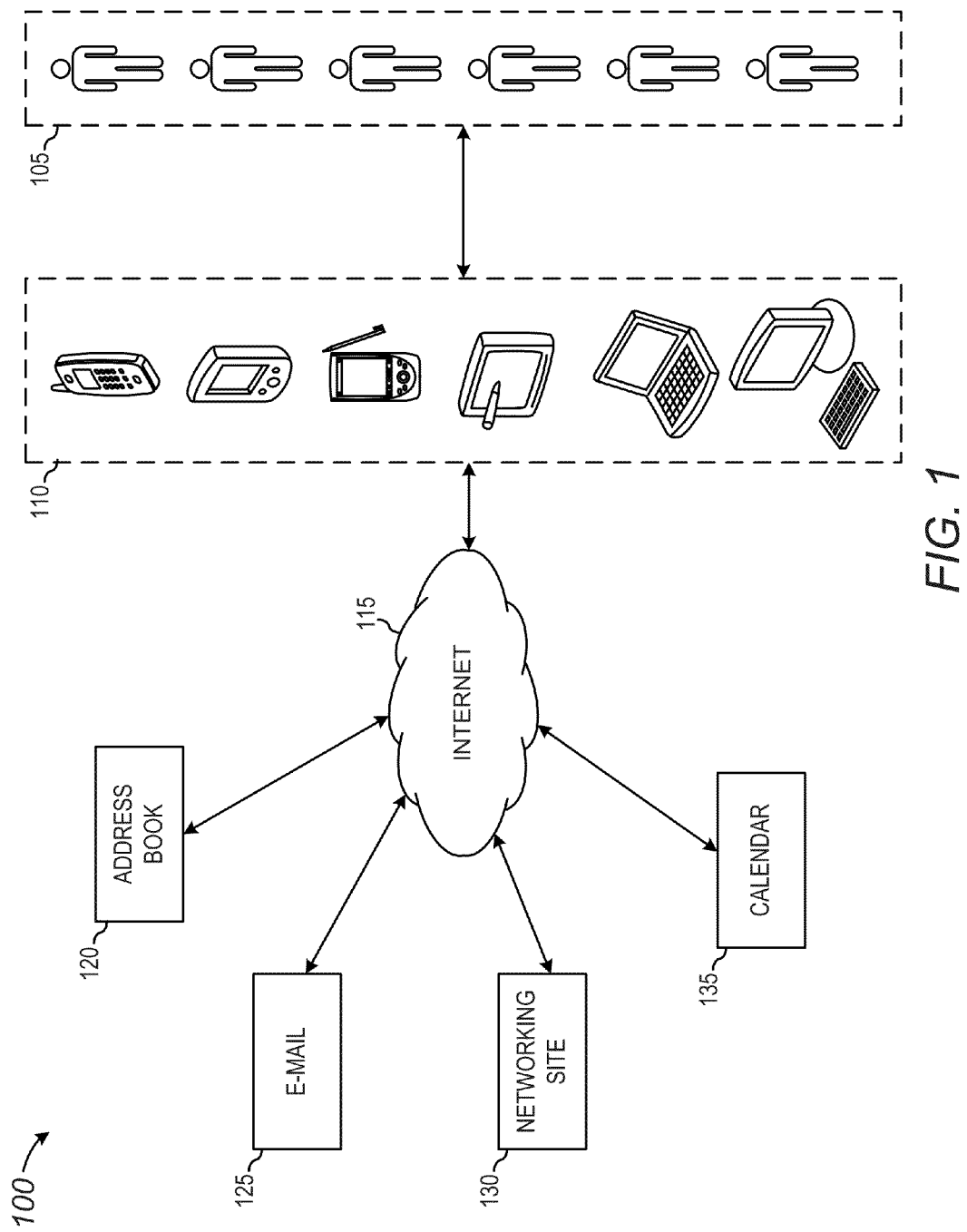
FIG. 1 is a block diagram illustrating a communication environment of networking contacts according to an example embodiment.

FIG. 1 is a block diagram illustrating a communication environment of networking contacts 100, according to an example embodiment. A large number of Internet users 105 may use a variety of electronic communications devices 110 to connect to the Internet 115 and maintain communication with other Internet users 105. Internet users 105 may in the course of their utilization of the Internet 115 end up connecting with, communicating with, or simply encountering a large number of contacts across a number of contact information sites on the Internet 115. Some of the contact information sites may include an address book provider 120, an e-mail provider 125, a networking site 130, a contacts aggregator (not shown), and a calendar provider 135.

In the course of pursuing Internet communication connections, the user of an online address book with profile bookmarking capabilities may be able to bookmark the social profiles of communication connections with Internet users 105 not already in the contact list of their online address book and add a selected social profile corresponding to a newly encountered contact to their address book. The user may also gain further profile information about the candidate contact from further networking sites and have the option of including the associated further social profile information available from these sites.

From snippets of a candidate contact's profile information gained during Internet navigation, an online address book user may be interested in reviewing further information about the candidate contact. The user may generally sense that further information from the candidate contact's profile, alluded to in part by the encountered snippet, would be of further interest to them in deciding whether to pursue including the candidate contact in their network and contact list. Additionally, a user may desire having further profile information available from further networking sites that the candidate contact may be affiliated with.

Interfaces

Figure 2:
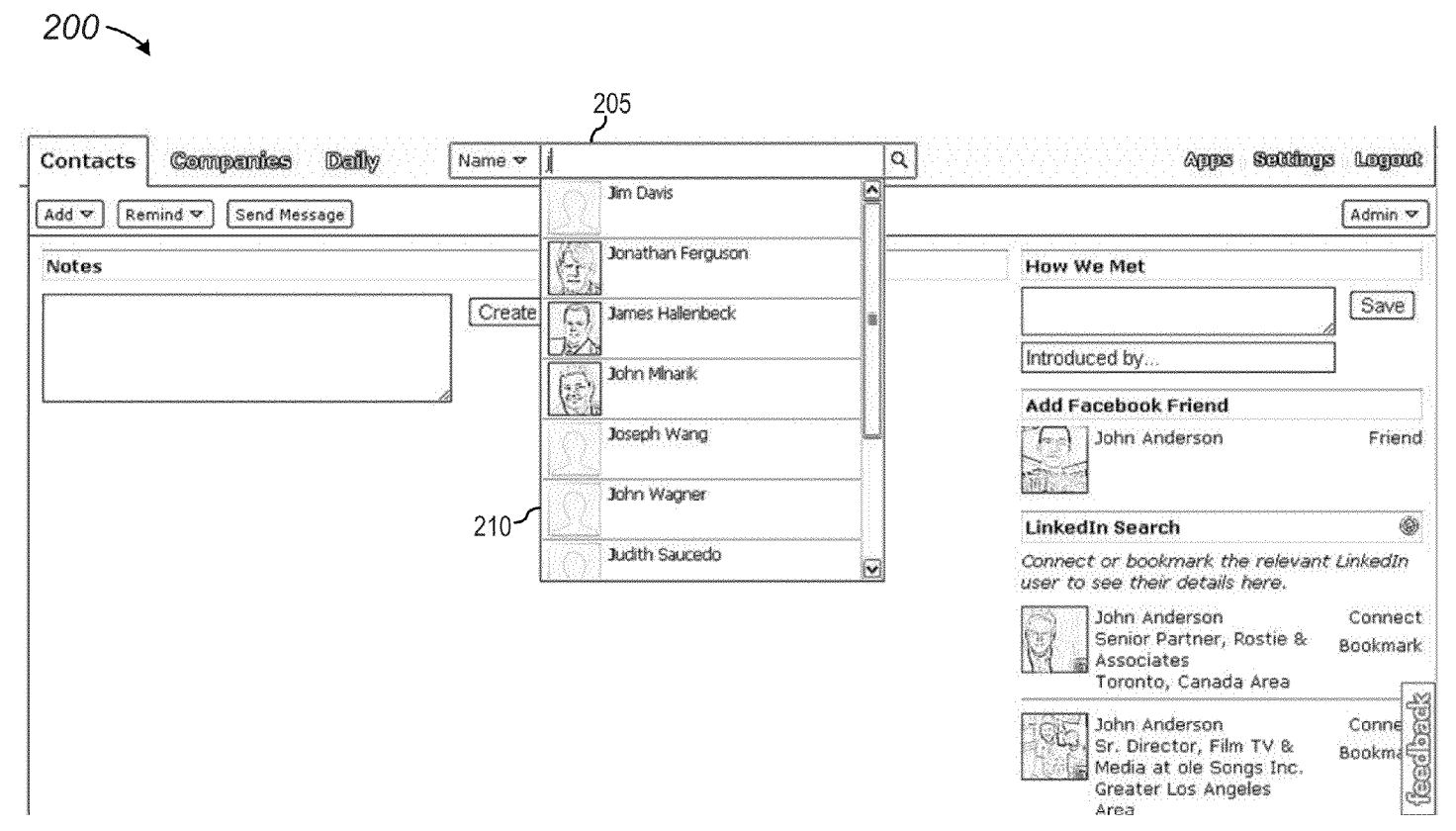

FIG. 2 is a diagrammatic representation of an online address book 200 including a multi-use input bar 205, as may be used in an example embodiment. The online address book 200 may include the multi-use input bar 205 in which characters may be entered to build up search terms and trigger contact searches. The multi-use input bar 205 may be available from anywhere within the online address book 200. The multi-use input bar 205 may be positioned in an upper portion of an online address book webpage. Use of the multi-use input bar 205 to enter search terms may be known as a "smart search" or "unified search" of contacts available in an online address book 200 or available generally at networking sites linked-to by the user. Search terms entered in the multi-use input bar 205 may be used to navigate to contacts already existing in the user's contact list within the online address book environment as well as trigger further searching over the Internet to networking sites the user has linked-to.

Initial search entries may reveal matches to existing contacts in the user's contact list within the online address book 200. The initial search terms entered reveal the broadest match to the user's existing contacts. Each successive character added further refines the match of existing contacts. As a character is entered as part of an initial search term, existing contacts in the user's contact list that match the search term are displayed in a drop-down menu 210. For example, entering the letter J may present a snippet of the profile of existing contacts whose name begins with the letter J. Each existing contact determined to match the search term is presented in the drop-down menu 210 with a snippet of profile information. The snippet of profile information may include each respective contact's profile portrait.

Each existing contact matched is displayed with a snippet of their existing profile portrait along with a user-selectable link to navigate directly to their existing profile entry within the online address book 200. Contacts matching the search term up to a given point of characters entered, may be displayed in a drop down menu format beneath the multi-use input bar 205. As further characters are added to the search term being entered in the multi-use input bar 205 fewer existing contacts may match and the number of entries of existing contacts in the drop-down menu 210 will correspondingly become fewer.

FIG. 3 is a further diagrammatic representation of the online address book 200 including the instance of the multi-use input bar 205, as may be used in an example embodiment. Further refinement of the search term entered in the multi-use input bar 205 may develop a contact search term that does not match any of the user's existing contacts. Instead the search term may match further contacts within the user's linked-to networking sites. These further contacts are outside their network and contact list. This type of search may be used, for example, in a situation where the user knows that the contact exists in general but does not have that contact as an existing contact within their online address book 200. These further contacts or candidate contacts may be presented with display information available from their social profiles. A contact's social profile may correspond to that portion of their profile at a networking site that they have selected to share publicly.

After entry of a search term in the multi-use input bar 205 that is refined beyond any match to the user's existing contacts, candidate contacts may be presented and organized according to the networking sites they are found on during the search. For example, candidate contacts may be presented according to a professional networking site 305, a social networking site 310, and a short messaging site 315. The candidate contacts may be presented with a user-selectable link to their social profile 320 as well as a create link 325, 330. When selected, the create link 325, 330 creates a new public profile within the contact list of the user's online address book 200. This type of new profile creation may be referred to as "bookmarking social profiles" or "profile bookmarking." Either term refers to the building of a contact record based on public profile information.

Figure 4:
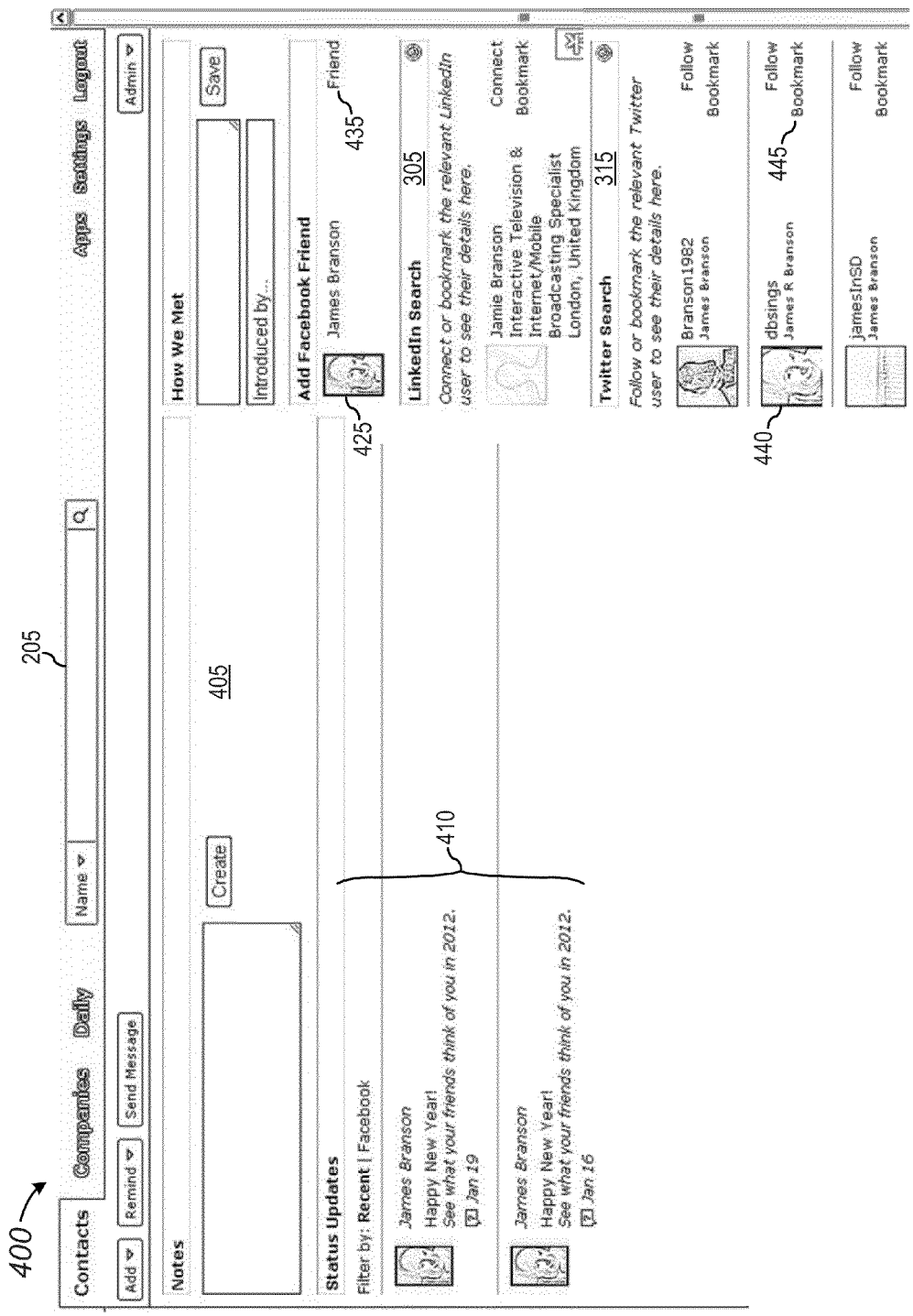
FIG. 4 is a diagrammatic representation of a profile bookmarking selection, as may be used in an example embodiment.

FIG. 4 is a diagrammatic representation of a profile bookmarking selection 400, as may be used in an example embodiment. After either of the create links 325, 330 has been selected, a new public profile 405 is created corresponding to the selected contact which includes associated social profile information 410 available from the networking site corresponding to the selected create link 325. Further candidate contacts may be presented according to any remaining one of the presentations of candidate contacts at the professional networking site 305, the social networking site 310, and the short messaging site 315. For example, the short messaging site 315 and the professional networking site 305 (FIG. 3) may be remaining further candidate contact presentations.

By way of further example, when the first create link 325 corresponding to a social networking site is selected for creation of the public profile of a contact, a snippet of their social profile 425 from the social networking site is presented. Along with the snippet of the social network social profile 425, a social network connection link 435 is also presented. The social network connection link 435 initiates a connection to the contact at the social networking site 310.

The user may recognize that a further candidate contact 440 may correspond with the candidate contact from the social networking site chosen by selection of the selected create link 325. The user may continue the profile bookmarking process by selection of a profile bookmarking link 445 corresponding with the further candidate contact 440.

Figure 5:
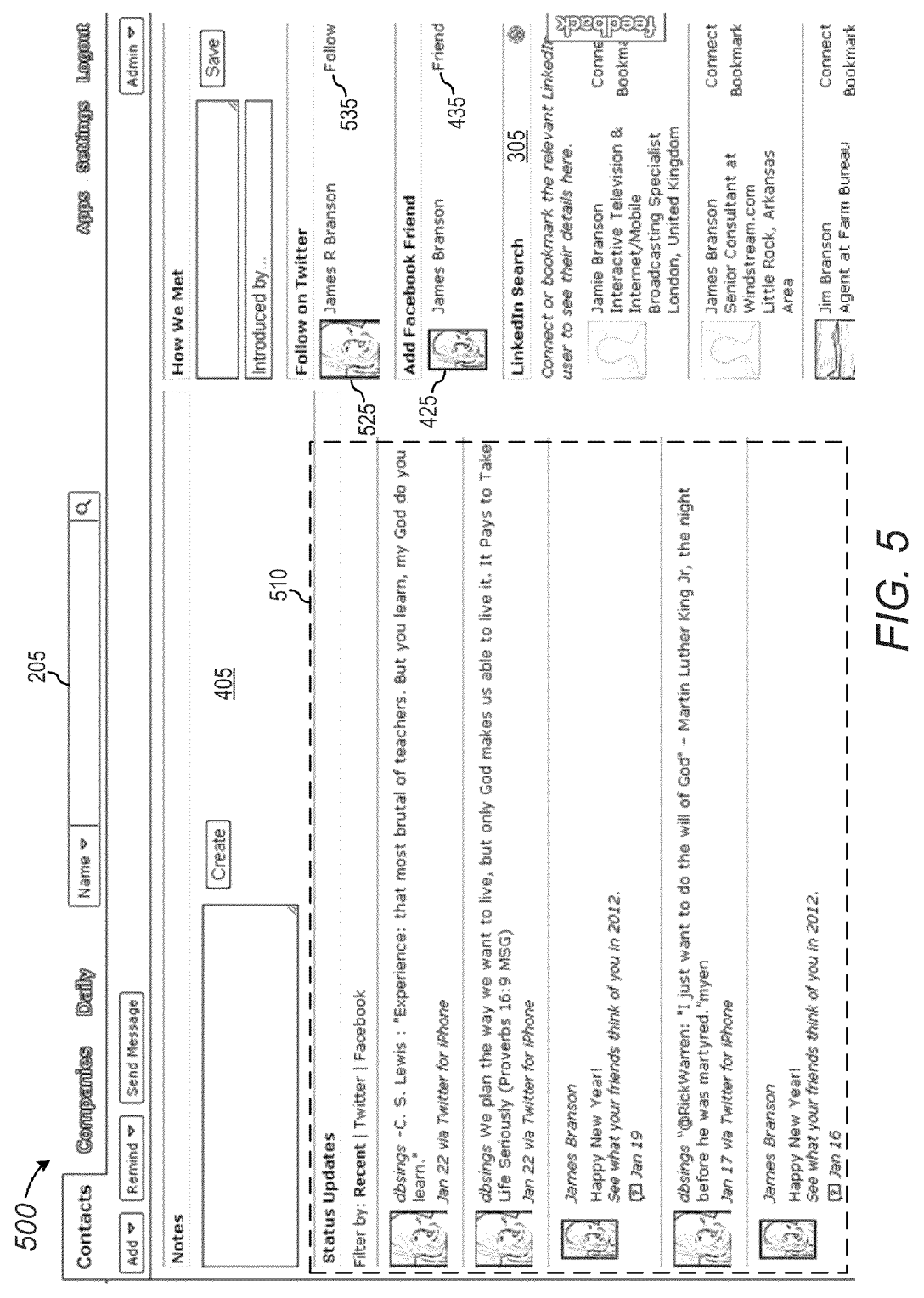

FIG. 5 is a further diagrammatic representation of a profile bookmarking selection 500, according to an example embodiment. In the event that the user recognizes that the further candidate contact 440 (FIG. 4) corresponds with the candidate contact selection from the social networking site, the profile bookmarking process may continue by the user's selection of the profile bookmarking link 445 (FIG. 4). This causes the contact information associated with the social profile data at the short messaging site 350 to be merged into the new public profile 405.

A merged set of associated social profile information 510 available from the social networking site 310, and the short messaging site 315 networking site is presented in the new public profile 405. Further candidate contacts may be presented according to the search of the remaining professional networking site 305 (FIG. 3). Along with the snippet of the social profile 425 and the social network connection link 435, a snippet of a short message social profile 525 and a short message network connection link 535 are presented as well. In addition to literally providing selection links, these social profile snippets and network connection links provide an indication of the social profiles that have been merged into the new public profile 405 being displayed.

Figure 6:
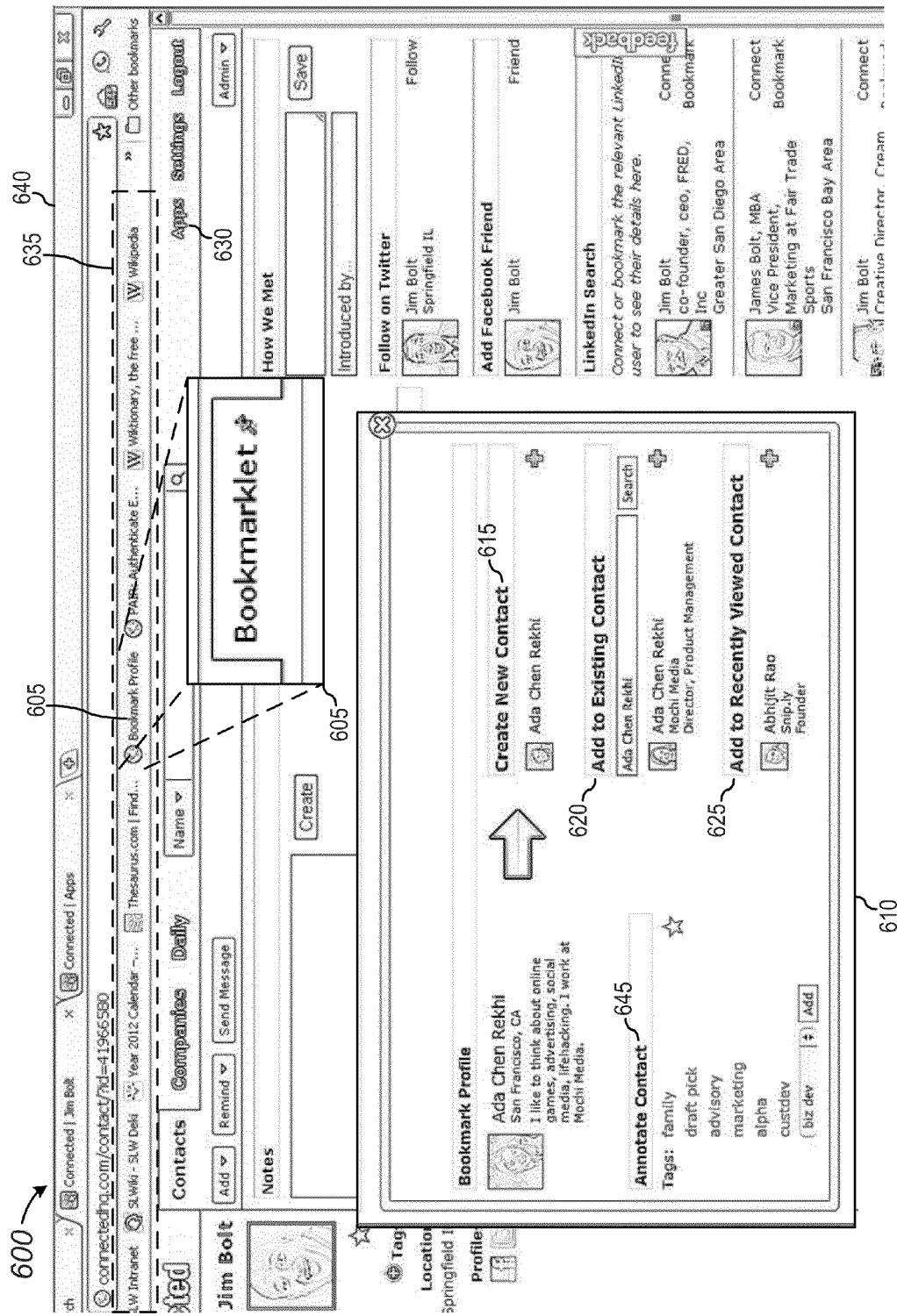
FIG. 6 is a diagrammatic representation of a profile bookmarking selection by a bookmarklet, as may be used in an example embodiment.

FIG. 6 is a diagrammatic representation of a profile bookmarking selection by a bookmarklet 600, as may be used in an example embodiment. After an initial installation in a bookmark bar 635 of a browser 640, a bookmarklet 605 is available to provide further profile bookmarking capabilities. The bookmarklet is useful from within a web page corresponding to a candidate contact appearing at any one of the professional networking site 305, the social networking site 310, and the short messaging site 315. Once selected from the bookmark bar 635, the bookmarklet 600 provides a profile bookmarking pop-up window 610 to provide profile bookmarking options to create a new contact 615, add the present candidate contact to an existing contact 620, and add the present candidate contact to a recently viewed contact 625. Additionally, the new contact produced by the profile bookmarking pop-up window 610 may be annotated with contact tags 645.

After being selected from the bookmark bar 635 of the browser 640 and prior to providing the profile bookmarking pop-up window 610, the bookmarklet 605 determines the identity of the present candidate contact by either parsing a remainder of a user identifier path name, locating a universal locator link in a public contact profile (and acquiring the identity by using an application programming interface [API]), or determining a contact identifier contained within a body of the markup language representation. The identity location technique may be determined according to the representation of the candidate contact at the networking site.

The bookmarklet 605 may be installed in the bookmark bar 635 of the browser 640 by the user's first selecting an applications tab 630. From amongst a listing of possible applications (not shown) a bookmarklet installation webpage may be presented which includes a bookmarklet installation link. By click-dragging the bookmarklet installation link to the bookmark bar 635 of the browser 640 the bookmarklet may be completely installed. In so doing, the bookmarklet 605 is immediately available for profile bookmarking of any candidate contact navigated to as in the networking sites described above, for example.

Profile bookmarking may typically have available the name, company name, and work history of a candidate contact from public profile information. Profile bookmarking can be applied in successive iterations to several different public profiles at various networking sites. In this way, profile bookmarking may build a public profile with social networking data without being connected (e.g., being "friends" or "following") with the candidate contact. In fact, after selection, the candidate contact may become a "public contact" within the contact list presented in the online address book 200 of the user. A public contact may be presented within a contact list presented in the online address book 200 along with the users existing contact records. The new public contact may have a contact record including a grayed-out graphical icon or symbolic logo corresponding to networking sites that the public profile information has been acquired from.

Classically, a user would have to build all of the data and links to a candidate contact themselves. Through the use of profile bookmarking all of the work of searching, locating, retrieving, and presenting user selectable links for bookmarking are done automatically for the user and thus saves the user from a considerable amount of effort. By using profile bookmarking the user is able to view a contact during the course of navigating the Internet, and on noting a contact that the user feels the might be interested in tracking but not necessarily interested in connecting to yet, can build a profile and gather a significant amount of publicly shared information as well as subscribe to publicly shared status updates for the contact. In this way the user can become familiar with a candidate contact before committing to "friend them" or "follow them" and commit their own personal information to an otherwise unknown contact. This ability in developing a public contact through profile bookmarking is especially beneficial when the user may be about to meet the candidate contact in an upcoming business meeting or social encounter.

System

Figure 7:
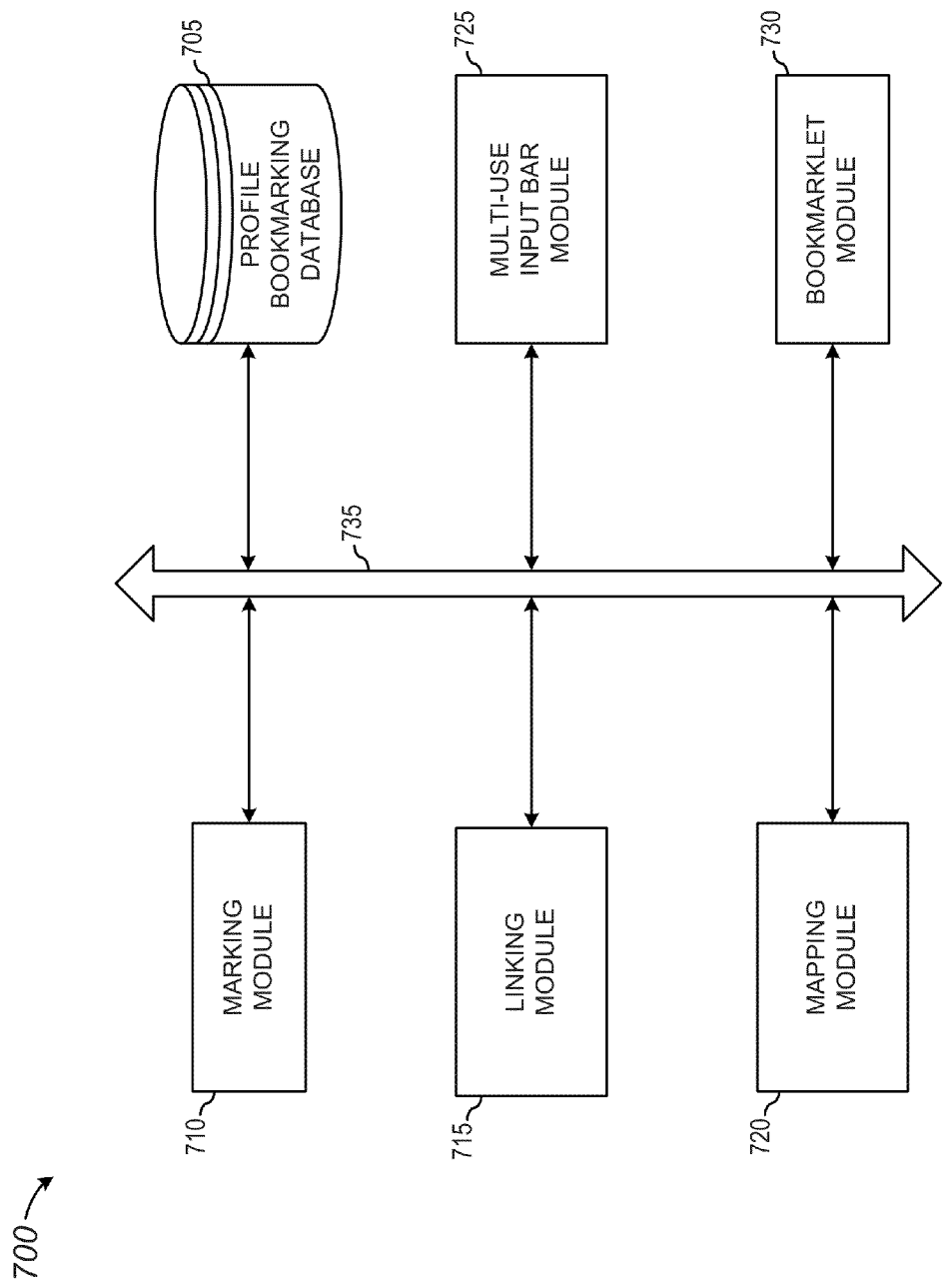
FIG. 7 is a block diagram illustrating profile bookmarking modules, according to an example embodiment.

FIG. 7 is a block diagram illustrating profile bookmarking modules 700, according to an example embodiment. The profile bookmarking modules 700 include a server (not shown) that includes at least one processing device configured to implement at least the respective profile bookmarking modules listed herein. The profile bookmarking modules 700 include a computer memory storing a profile bookmarking database 705. A marking module 710 configured to mark a contact indicator associated with a contact and a corresponding contact profile at a networking site according to a bookmarking indication from the user. The marking module 710 accepts the user's input from the selected create link 325, for example, and may produce the new public profile 405.

A linking module 715 may be configured to link to a networking site according to a selection indication received from a user device. The user may establish the links to the networking sites at the time of initial setup of the online address book. A mapping module 720 is configured to map a set of contact descriptors corresponding to a marked contact indicator into a contact record to be associated with the contact. The set of contact descriptors may be taken from the public profile at the networking site corresponding to the contact. A multi-use input bar module 725 is configured to accept contact descriptors received from the user device and initiate searches for a candidate contact. A bookmarklet module 730 is configured to be installed in a bookmark bar of a network browser and receive a selection indication associated with the contact indicator. All of the profile bookmarking modules 700 are communicatively coupled to one another through a module system bus 735.

Methods

Figure 8:
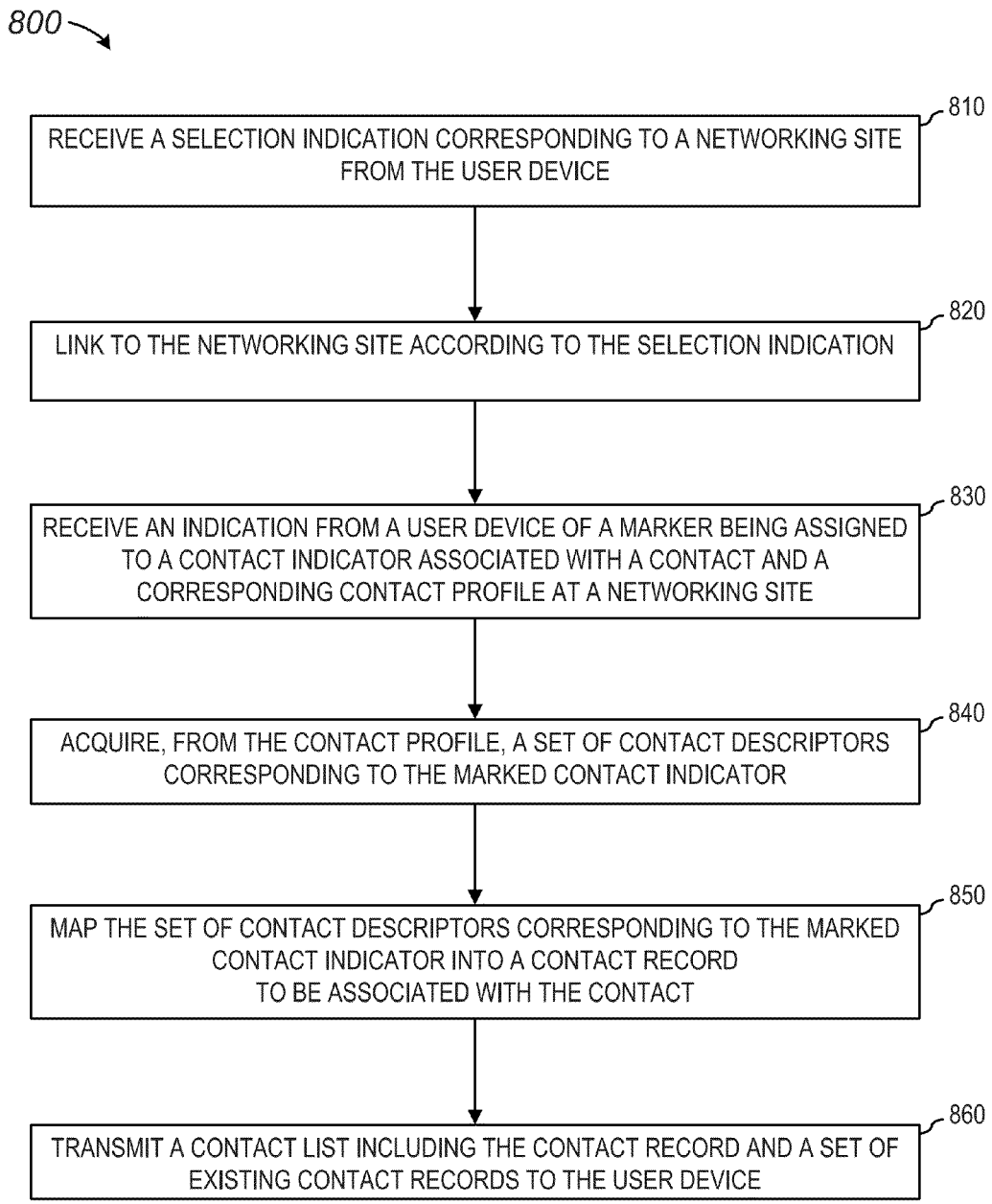
FIG. 8 is a flow chart illustrating a method to bookmark a contact profile to a contact list, according to an example embodiment.

FIG. 8 is a flow chart illustrating a method to bookmark a contact profile to a contact list 800, according to an example embodiment. The method to bookmark a contact profile to a contact list 800 may be performed by any of the modules, logic, or components described herein. The method commences with receiving 810 a selection indication corresponding to a networking site from a user device and continues with linking 820 to the networking site according to the selection indication. Next the method involves receiving 830 an indication from a user device of a marker being assigned to a contact indicator associated with a contact and a corresponding contact profile at a networking site and goes on with acquiring 840, from the contact profile, a set of contact descriptors corresponding to the marked contact indicator. The method continues with mapping 850 the set of contact descriptors corresponding to the marked contact indicator into a contact record to be associated with the contact and responsive to the mapping the set of contact descriptors, the method concludes with transmitting 860 a contact list including the contact record and a set of existing contact records to the user device.

Figure 9:
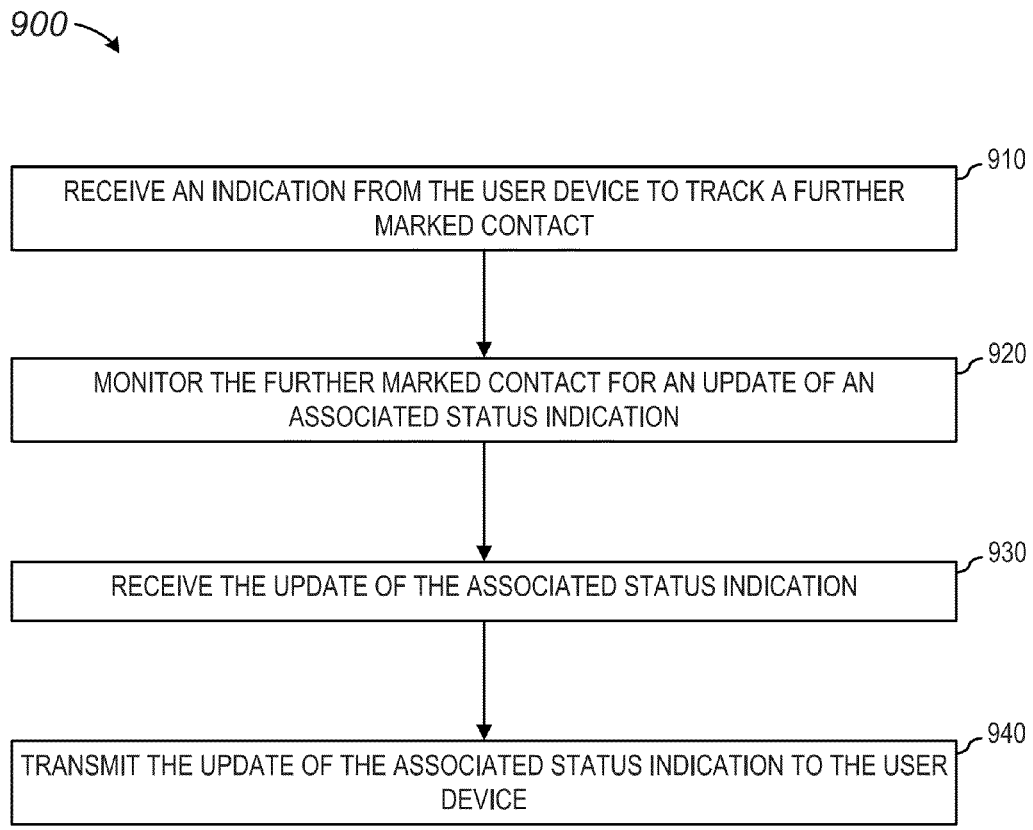
FIG. 9 is a flow chart illustrating a method to track a marked contact as to a status update, as may be used in an example embodiment.

FIG. 9 is a flow chart illustrating a method to track a marked contact as to a status update 900, as may be used in an example embodiment. The method to track a marked contact as to a status update 900 may be performed by any of the modules, logic, or components described herein. The method commences with receiving 910 an indication from the user device to track a further marked contact and responsive to the receiving an indication from the user device, the method continues with monitoring 920 the further marked contact for an update of an associated status indication. Subsequent to the monitoring the further marked contact, the method continues with receiving 930 the update of the associated status indication and responsive to the receiving the update of the associated status indication, the method concludes with transmitting 940 the update of the associated status indication to the user device.

Figure 10:
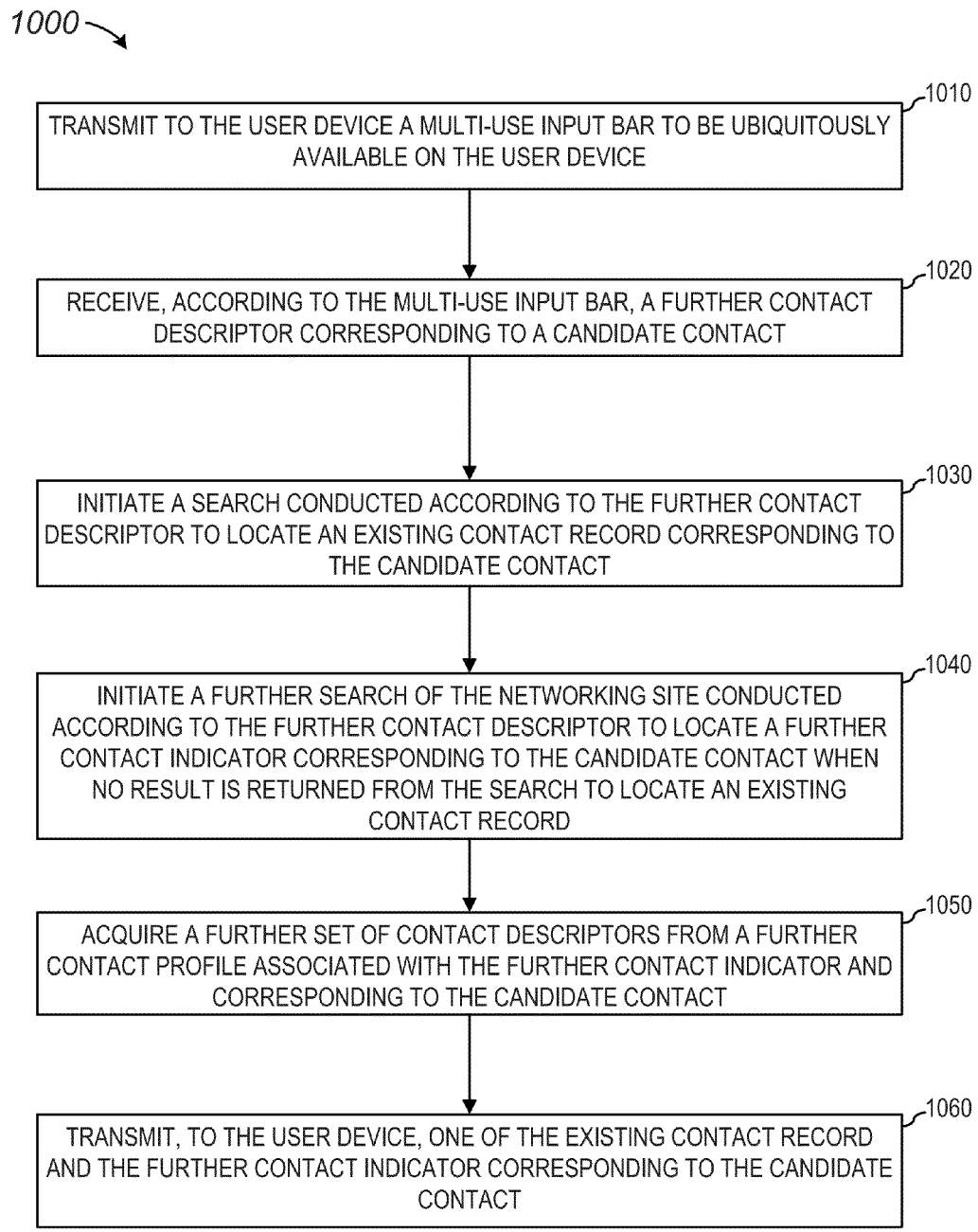
FIG. 10 is a flow chart illustrating a method to conduct profile bookmarking according to a multi-use input bar, according to an example embodiment.

FIG. 10 is a flow chart illustrating a method to conduct profile bookmarking according to a multi-use input bar 1000, according to an example embodiment. The method to conduct profile bookmarking according to a multi-use input bar 1000 may be performed by any of the modules, logic, or components described herein. The method commences with transmitting 1010 to a user device a multi-use input bar to be ubiquitously available on the user device and continues with receiving 1020, according to the multi-use input bar, a further contact descriptor corresponding to a candidate contact. The method next involves initiating 1030 a search conducted according to the further contact descriptor to locate an existing contact record corresponding to the candidate contact and continues with initiating 1040 a further search of the networking site conducted according to the further contact descriptor to locate a further contact indicator corresponding to the candidate contact when no result is returned from the search to locate an existing contact record. The method continues with acquiring 1050 a further set of contact descriptors from a further contact profile associated with the further contact indicator and corresponding to the candidate contact and concludes with transmitting 1060, to the user device, one of the existing contact record and the further contact indicator corresponding to the candidate contact.

Figure 11:
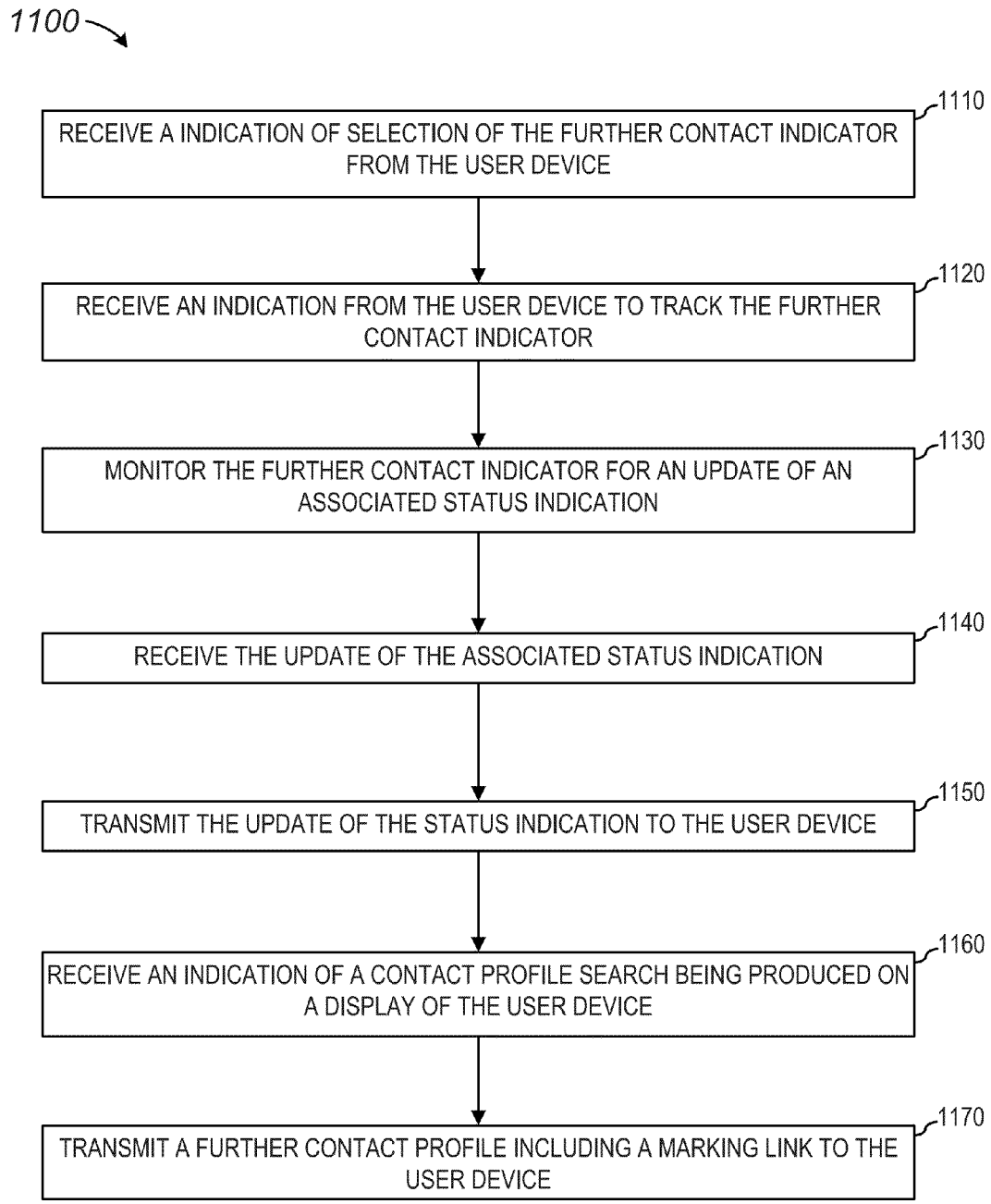
FIG. 11 is a flow chart illustrating a method to extend profile bookmarking to further contacts, as may be used in an example embodiment.

FIG. 11 is a flow chart illustrating a method to extend profile bookmarking to further contacts 1100, as may be used in an example embodiment. The method to extend profile bookmarking to further contacts 1100 may be performed by any of the modules, logic, or components described herein. The method commences with receiving 1110 a indication of selection of the further contact indicator from the user device and continues with receiving 1120 an indication from the user device to track the further contact indicator. Responsive to the receiving an indication from the user device, the method continues with monitoring 1130 the further contact indicator for an update of an associated status indication and subsequent to the monitoring the further contact indicator, the method involves receiving 1140 the update of the associated status indication. Responsive to the receiving the update of the associated status indication, the method continues with transmitting 1150 the update of the status indication to the user device and the method next involves receiving 1160 an indication of a contact profile search being produced on a display of the user device. Responsive to the receiving an indication of a contact profile search, the method concludes with transmitting 1170 a further contact profile including a marking link to the user device.

Figure 12:
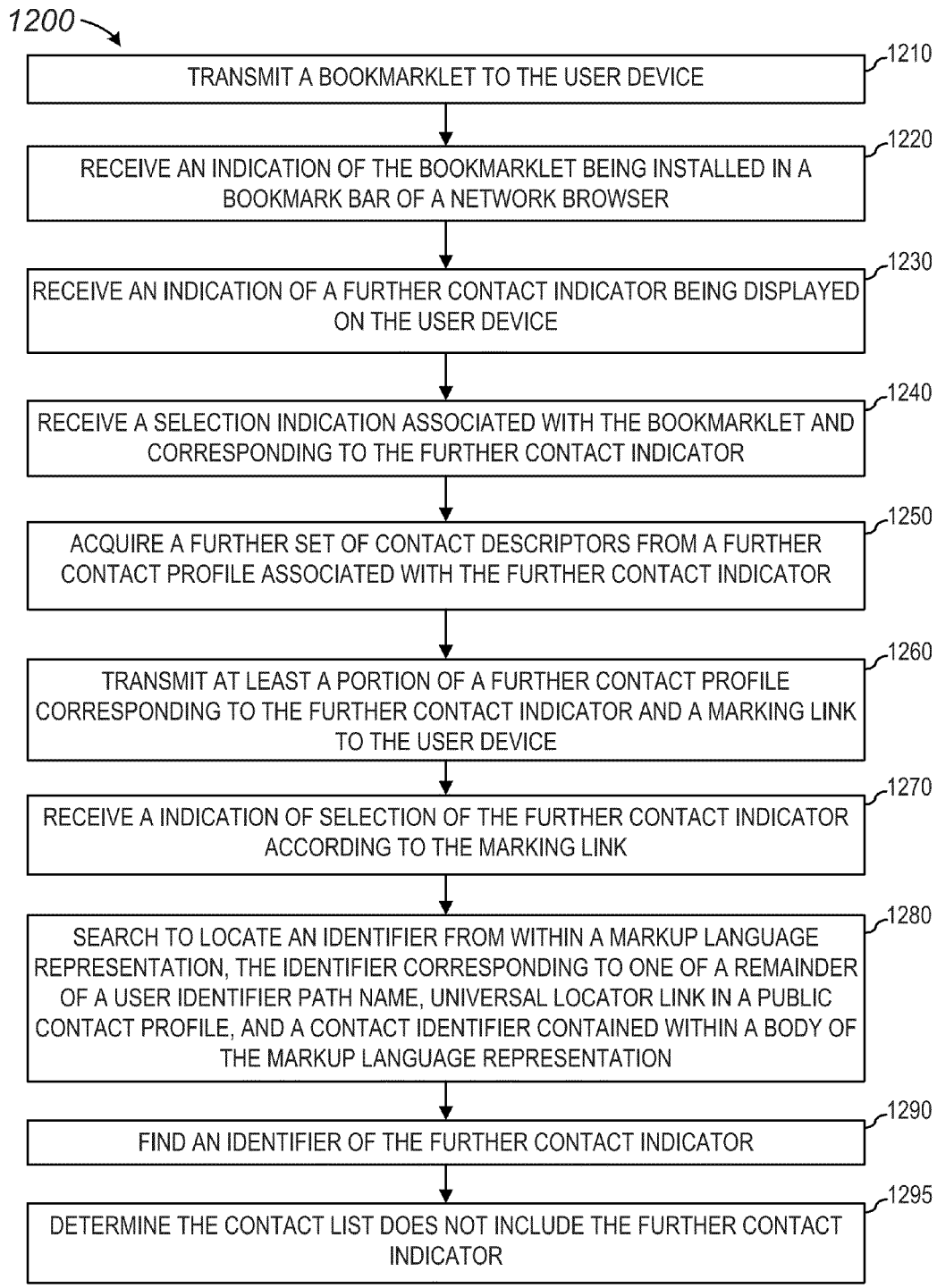
FIG. 12 is a flow chart illustrating a method to conduct profile bookmarking according to a bookmarklet, as may be used in an example embodiment.

FIG. 12 is a flow chart illustrating a method to conduct profile bookmarking according to a bookmarklet 1200, as may be used in an example embodiment. The method to conduct profile bookmarking according to a bookmarklet 1200 one may be performed by any of the modules, logic, or components described herein. The method commences by transmitting 1210 a bookmarklet to the user device and continues with receiving 1220 an indication of the bookmarklet being installed in a bookmark bar of a network browser. Subsequent to receiving the indication of the bookmarklet being installed, the method continues with receiving 1230 an indication of a further contact indicator being displayed on the user device and subsequent to the receiving an indication of a further contact indicator being displayed, the method further involves receiving 1240 a selection indication associated with the bookmarklet and corresponding to the further contact indicator. Responsive to the receiving a selection indication corresponding to the further contact indicator, the method continues with acquiring 1250 a further set of contact descriptors from a further contact profile associated with the further contact indicator and responsive to the acquiring a further set of contact descriptors, the method continues with transmitting 1260 at least a portion of a further contact profile corresponding to the further contact indicator and a marking link to the user device.

Subsequent to the transmitting at least a portion of a further contact profile and a marking link, the method goes on with receiving 1270 a indication of selection of the further contact indicator according to the marking link and the method continues by searching 1280 to locate an identifier from within a markup language representation, the identifier corresponding to one of a remainder of a user identifier path name, universal locator link in a public contact profile, and a contact identifier contained within a body of the markup language representation. Responsive to the searching to locate an identifier, the method continues with finding 1290 an identifier of the further contact indicator and prior to the transmitting at least a portion of a contact profile including a marking link, the method concludes with determining 1295 the contact list does not include the further contact indicator.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Machine Architecture

Figure 13:
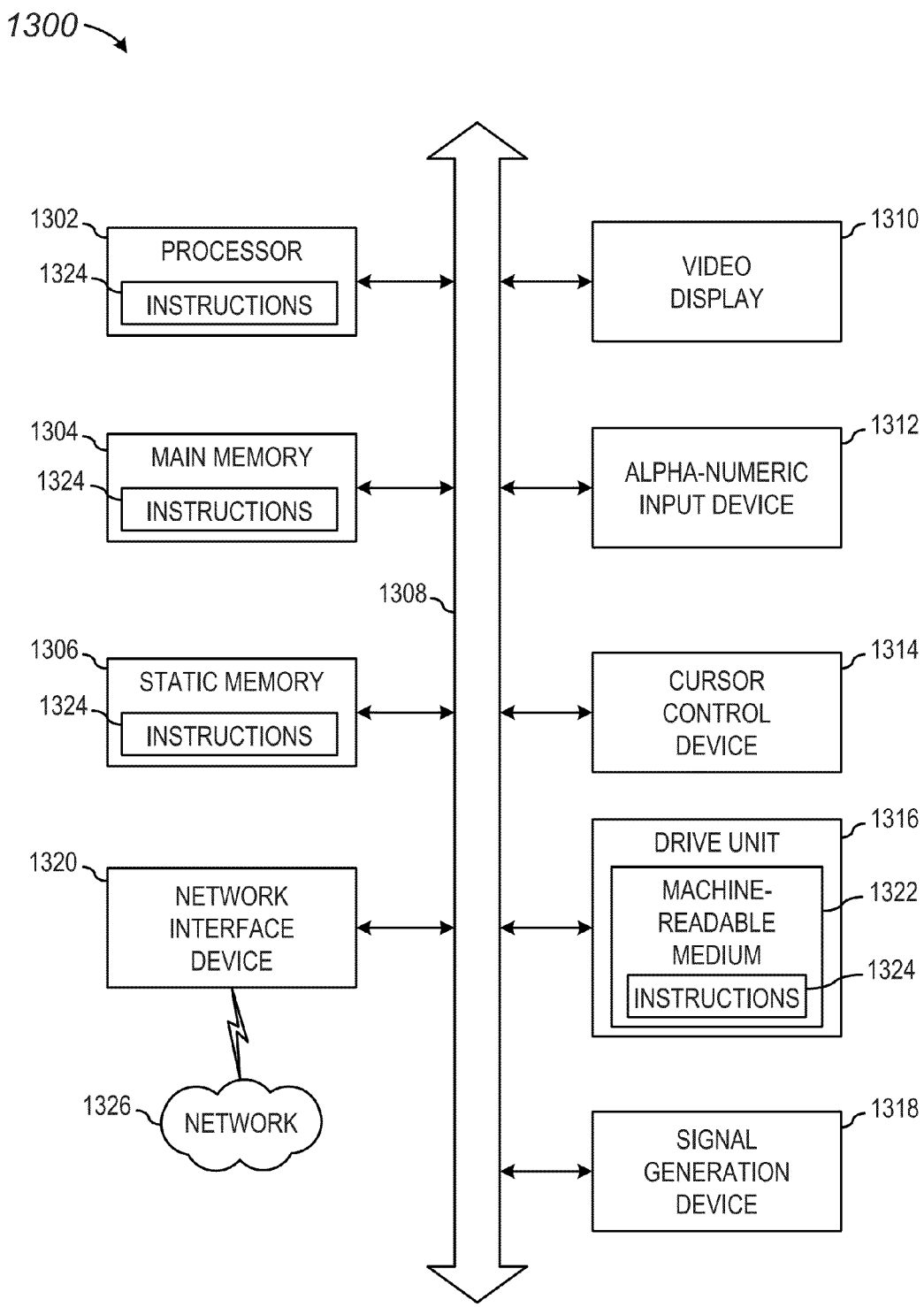
FIG. 13 is a block diagram of machine in the example form of a computer system within which a set instructions, for causing the machine to perform any one or more of the methodologies discussed herein, may be executed.

FIG. 13 is a block diagram of machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Plural instances may be provided for components, operations, or structures described herein as a single instance. Finally, boundaries between various components, operations, and data stores may be somewhat arbitrary, and particular operations may be illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving an indication from a user device of a marker being assigned to a contact indicator associated with a candidate contact and a corresponding candidate contact profile at a networking site, the candidate contact not having a connection via the networking site to a user account of the user of the user device;
    acquiring, from the candidate contact profile, a set of contact descriptors corresponding to the marked contact indicator, the set of contact descriptors being those contact descriptors designated by the candidate contact as publicly available;

wherein the candidate contact profile comprises data from at least one further network site with which the candidate contact is affiliated;

mapping the set of contact descriptors corresponding to the marked contact indicator into a contact record to be associated with the candidate contact;

responsive to the mapping the set of contact descriptors, transmitting a contact list including the contact record and a set of existing contact records to the user device;

monitoring the at least one further networking site with which the candidate contact is affiliated for publicly shared status updates of the candidate contact;

receiving at least one publicly shared status update of the candidate contact; and responsive to receiving the at least one publicly shared status update of the candidate contact, transmitting the publicly shared status update of the candidate contact to the user device.

2. The method of claim 1, further comprising:
receiving a selection indication corresponding to the networking site from the user device;
linking to the networking site according to the selection indication; and
responsive to the mapping the set of contact descriptors, saving the contact record corresponding to the candidate contact to the contact list.

3. The method of claim 1, wherein:
the corresponding candidate contact profile includes one of a contact name, a name of a worked-for company, and a work history, and
the indication, of a marker being assigned to a contact indicator, is associated with a user account of a user of the user device.

4. The method of claim 1, further comprising:
transmitting to the user device a multi-use input bar to be ubiquitously available on the user device;
receiving, according to the multi-use input bar, a further contact descriptor corresponding to a candidate contact;
initiating a search conducted according to the further contact descriptor to locate an existing contact record corresponding to the candidate contact;
initiating a further search of the networking site conducted according to the further contact descriptor to locate a further contact indicator corresponding to the candidate contact when no result is returned from the search to locate an existing contact record;
acquiring a further set of contact descriptors from a further contact profile associated with the further contact indicator and corresponding to the candidate contact; and
transmitting, to the user device, one of the existing contact record and the further contact indicator corresponding to the candidate contact.

5. The method of claim 4, further comprising:
receiving a indication of selection of the further contact indicator from the user device;
receiving an indication from the user device to track the further contact indicator;
responsive to the receiving an indication from the user device, monitoring the further contact indicator for an update of an associated status indication;
subsequent to the monitoring the further contact indicator, receiving the update of the associated status indication; and responsive to the receiving the update of the associated status indication, transmitting the update of the status indication to the user device,
wherein the contact indicator includes a public status update.

6. The method of claim 4, wherein:
the further contact indicator including a public profile,
the further contact indicator transmitted to the user device including a user-selectable link to add, when selected, the further contact indicator to the contact list,
the further contact descriptor received from the user device being associated with a user account, and
the further contact indicator not having a network connection to the user account.

7. The method of claim 1, further comprising:
receiving an indication of a contact profile search being produced on a display of the user device and
responsive to the receiving an indication of a contact profile search, transmitting a further contact profile including a marking link to the user device,
wherein the indication of a contact profile search being associated with a user account and the further contact profile not having a network connection to the user account.

8. The method of claim 1, further comprising:
transmitting a bookmarklet to the user device;
receiving an indication of the bookmarklet being installed in a bookmark bar of a network browser;
subsequent to receiving the indication of the bookmarklet being installed, receiving an indication of a further contact indicator being displayed on the user device;
subsequent to the receiving an indication of a further contact indicator being displayed, receiving a selection indication associated with the bookmarklet and corresponding to the further contact indicator;
responsive to the receiving a selection indication corresponding to the further contact indicator, acquiring a further set of contact descriptors from a further contact profile associated with the further contact indicator;
responsive to the acquiring a further set of contact descriptors, transmitting at least a portion of a further contact profile corresponding to the further contact indicator and a marking link to the user device; and
subsequent to the transmitting at least a portion of a further contact profile and a marking link, receiving a indication of selection of the further contact indicator according to the marking link.

9. The method of claim 8, further comprising:
searching to locate an identifier from within a markup language representation, the identifier corresponding to one of a remainder of a user identifier path name, universal locator link in a public contact profile, and a contact identifier contained within a body of the markup language representation;
responsive to the searching to locate an identifier, finding an identifier of the further contact indicator; and
prior to the transmitting at least a portion of a contact profile including a marking link, determining the contact list does not include the further contact indicator.

10. A non-transitory machine-readable storage medium embodying a set of instructions, that when executed by at least one processor, causes the at least one processor to perform operations comprising:
receiving an indication from a user device of a marker being assigned to a contact indicator associated with a candidate contact and a corresponding candidate contact profile at a networking site, the candidate contact not having a connection via the networking site to a user account of the user of the user device;

acquiring, from the candidate contact profile, a set of contact descriptors corresponding to the marked contact indicator, the set of contact descriptors being those contact descriptors designated by the candidate contact as publicly available;

wherein the candidate contact profile comprises data from at least one further network site with which the candidate contact is affiliated;

mapping the set of contact descriptors corresponding to the marked contact indicator into a contact record to be associated with the candidate contact; and responsive to the mapping the set of contact descriptors, transmitting a contact list including the contact record and a set of existing contact records to the user device;

monitoring the at least one further networking site with which the candidate contact is affiliated for publicly shared status updates of the candidate contact;

receiving at least one publicly shared status update of the candidate contact; and responsive to receiving the at least one publicly shared status update of the candidate contact, transmitting the publicly shared status update of the candidate contact to the user device.

11. The machine-readable storage medium of claim 10, further comprising:
receiving a selection indication corresponding to the networking site from the user device;
linking to the networking site according to the selection indication; and
responsive to the mapping the set of contact descriptors, saving the contact record corresponding to the candidate contact to the contact list.

12. The machine-readable storage medium of claim 10, wherein:
the corresponding contact profile includes one of a contact name, a name of a worked-for company, and a work history, and
the indication, of a marker being assigned to a contact indicator, is associated with a user account.

13. The machine-readable storage medium of claim 10, further comprising:
transmitting to the user device a multi-use input bar to be ubiquitously available on the user device;
receiving, according to the multi-use input bar, a further contact descriptor corresponding to a candidate contact;
initiating a search conducted according to the further contact descriptor to locate an existing contact record corresponding to the candidate contact;
initiating a further search of the networking site conducted according to the further contact descriptor to locate a further contact indicator corresponding to the candidate contact when no result is returned from the search to locate an existing contact record;
acquiring a further set of contact descriptors from a further contact profile associated with the further contact indicator and corresponding to the candidate contact; and
transmitting, to the user device, one of the existing contact record and the further contact indicator corresponding to the candidate contact.

14. The machine-readable storage medium of claim 13, further comprising:

receiving a indication of selection of the further contact indicator from the user device;
receiving an indication from the user device to track the further contact indicator;
responsive to the receiving an indication from the user device, monitoring the further contact indicator for an update of an associated status indication,
subsequent to the monitoring the further contact indicator, receiving the update of the associated status indication; and
responsive to the receiving the update of the associated status indication, transmitting the update of the status indication to the user device,
wherein the contact indicator includes a public status update.

15. The machine-readable storage medium of claim 10, further comprising:
receiving an indication of a contact profile search being produced on a display of the user device and
responsive to the receiving an indication of a contact profile search, transmitting a further contact profile including a marking link to the user device,
wherein the indication of a contact profile search being associated with a user account and the further contact profile not having a network connection to the user account.

16. The machine-readable storage medium of claim 10, further comprising:
transmitting a bookmarklet to the user device;
receiving an indication of the bookmarklet being installed in a bookmark bar of a network browser;
subsequent to receiving the indication of the bookmarklet being installed, receiving an indication of a further contact indicator being displayed on the user device;
subsequent to the receiving an indication of a further contact indicator being displayed, receiving a selection indication associated with the bookmarklet and corresponding to the further contact indicator;
responsive to the receiving a selection indication corresponding to the further contact indicator, acquiring a further set of contact descriptors from a further contact profile associated with the further contact indicator;
responsive to the acquiring a further set of contact descriptors, transmitting at least a portion of a further contact profile corresponding to the further contact indicator and a marking link to the user device; and
subsequent to the transmitting at least a portion of a further contact profile and a marking link, receiving a indication of selection of the further contact indicator according to the marking link.

17. The machine-readable storage medium of claim 16, further comprising:
searching to locate an identifier from within a markup language representation, the identifier corresponding to one of a remainder of a user identifier path name, universal locator link in a public contact profile, and a contact identifier contained within a body of the markup language representation;
responsive to the searching to locate an identifier, finding an identifier of the further contact indicator; and
prior to the transmitting at least a portion of a contact profile including a marking link, determining the contact list does not include the further contact indicator.

* * * * *

UNITED STATES PATENT AND TRADEMARK OFFICE
CERTIFICATE OF CORRECTION

PATENT NO. : 8,984,049 B1
APPLICATION NO. : 13/363739
DATED : March 17, 2015
INVENTOR(S) : Sachin Rekhi It is certified that error appears in the above-identified patent and that said Letters Patent is hereby corrected as shown below:

On the title page, in item (57), in "Abstract", in column 2, line 1, delete "multi-user" and insert --multi-use--, therefor On the title page, in item (57), in "Abstract", in column 2, line 2, delete "items" and insert --terms--, therefor On the title page, in item (57), in "Abstract", in column 2, line 5, delete "multi-user" and insert --multi-use--, therefor In the Claims:

In column 12, line 65, in Claim 1, after "user", delete "of the user", therefor

In column 12, line 2, in Claim 10, after "user", delete "of the user", therefor

Signed and Sealed this
Ninth Day of August, 2016

Michelle K. Lee
*Director of the United States Patent and Trademark Office*